UNITED STATES PATENT OFFICE.

HIRAM W. HENDRICKS, OF PORTLAND, OREGON.

ELASTIC COMPOUND FOR TRUSS-PADS.

SPECIFICATION forming part of Letters Patent No. 252,216, dated January 10, 1882.

Application filed February 28, 1881. (Specimens.)

*To all whom it may concern:*

Be it known that I, HIRAM W. HENDRICKS, a resident of the city of Portland, in the county of Multnomah, State of Oregon, have invented certain new and useful Improvements in Plastic Compounds for General Use, including the use in manufacturing pads for rupture-trusses, of which the following is a specification.

My invention relates to a compound in which plasticity is attained and produced by the combination in compound form of the herein-described ingredients or their equivalents.

The objects of my invention are, first, the formation of a compound which, when in contact with the human body to which it may be applied, will become, owing to the animal heat of the body, as soft and pliable as the part of the body to which it may be applied; secondly, to produce a compound composed of material which will not blister or scald the part of body to which it may be applied; thirdly, to produce a compound composed of materials or substance which, while affected by the temperature of the body, will still be cool to the touch— that is to say, the temperature of the compound will not be changed.

I form my plastic compound of the following ingredients or their equivalents: I take of glue five parts, of honey two and one-half parts, and, after dissolving, boil them by means of excessive steam heat in a tight vessel for a period of about two and one-half hours, the vessel in which the ingredients are placed being put inside of another suitable vessel for steaming same. I then add of "A" sugar five parts. When that has dissolved, then add of gutta-percha one-twentieth ($\frac{1}{20}$) part. The gutta-percha is crushed and pulverized into dust before being put into the vessel. I then boil these four ingredients for a period of two hours longer. At the end of that time I add the following ingredients, all at once: glycerine, five parts; borax, one-twentieth ($\frac{1}{20}$) part; alum, one-twentieth ($\frac{1}{20}$) part; black lead, one-twentieth ($\frac{1}{20}$) part; sulphur, one-twentieth ($\frac{1}{20}$) part; saltpeter, one-twentieth ($\frac{1}{20}$) part; then boil until dissolved. The composition is then taken out of the vessel and poured into molds the desired shape or size of the article manufactured.

The advantages which I claim for my plastic compound are, that it does not irritate, blister, or scald, and is always cool to the touch.

Having described my invention, what I desire to secure by Letters Patent is—

The herein-described plastic material, composed of glue, honey, sugar, gutta-percha, glycerine, borax, alum, black lead, sulphur, and saltpeter, substantially as described, and for the purpose set forth.

HIRAM W. HENDRICKS.

Witnesses:
  D. P. KENNEDY,
  G. G. GAMMAUS.